United States Patent
Takagi

(10) Patent No.: US 10,150,268 B2
(45) Date of Patent: Dec. 11, 2018

(54) BEAD RING MANUFACTURING DEVICE

(75) Inventor: Chikara Takagi, Hashima (JP)

(73) Assignees: FUJI SEIKO CO., LTD (JP); FUJI SHOJI CO., LTD. (JP)

( * ) Notice: Subject to any disclaimer, the term of this patent is extended or adjusted under 35 U.S.C. 154(b) by 657 days.

(21) Appl. No.: 14/395,427

(22) PCT Filed: Apr. 24, 2012

(86) PCT No.: PCT/JP2012/060925
§ 371 (c)(1),
(2), (4) Date: Apr. 3, 2015

(87) PCT Pub. No.: WO2013/160996
PCT Pub. Date: Oct. 31, 2013

(65) Prior Publication Data
US 2015/0217526 A1    Aug. 6, 2015

(51) Int. Cl.
*B29D 30/48* (2006.01)

(52) U.S. Cl.
CPC ........ *B29D 30/48* (2013.01); *B29D 2030/487* (2013.01)

(58) Field of Classification Search
CPC ............. B29D 30/48; B29D 2030/485; B29D 2030/487
See application file for complete search history.

(56) References Cited

U.S. PATENT DOCUMENTS

| | | | | |
|---|---|---|---|---|
| 2,151,306 A | * | 3/1939 | Shook | B29D 30/48 156/422 |
| 2,775,986 A | * | 1/1957 | Holroyd | B29D 30/48 140/88 |

(Continued)

FOREIGN PATENT DOCUMENTS

| CN | 201077153 | 6/2008 |
|---|---|---|
| CN | 201313146 | 9/2009 |

(Continued)

OTHER PUBLICATIONS

Machine generated English language translation of JP 06-286021 (original document dated Oct. 1994).*

(Continued)

*Primary Examiner* — Martin K Rogers
(74) *Attorney, Agent, or Firm* — Tarolli, Sundheim, Covell & Tummino LLP

(57) ABSTRACT

A rotary body is divided into four to form multiple partitioned members. A chuck mechanism includes an expanding and contracting mechanism that expands and contracts each partitioned member in a radial direction of the rotary body. The chuck mechanism mounts and dismounts the beginning of a wire in an interlocked relationship with expansion and contraction of each partitioned member. The expanding and contracting mechanism includes a guide member that moves each partitioned member back and forth in the radial direction, and a cam member that moves each partitioned member between a large-diameter position and a small-diameter position. The chuck mechanism includes a chuck arm, a coil spring that biases the chuck arm in a direction in which the chuck arm is closed, an arm member that opens and closes the chuck arm, and a cam actuator that makes the arm member pivot.

1 Claim, 3 Drawing Sheets

(56) References Cited

U.S. PATENT DOCUMENTS

| | | | | |
|---|---|---|---|---|
| 3,051,221 | A * | 8/1962 | Strozewski | B29D 30/48 156/136 |
| 4,923,553 | A * | 5/1990 | Nishide | B29D 30/32 156/401 |
| 6,021,972 | A | 2/2000 | Inoue et al. | |
| 2003/0029573 | A1* | 2/2003 | Franke | B29D 30/48 156/422 |
| 2003/0168144 | A1* | 9/2003 | Weaver | B29D 30/36 152/415 |
| 2011/0155300 | A1 | 6/2011 | Takaji | |

FOREIGN PATENT DOCUMENTS

| | | | |
|---|---|---|---|
| CN | 201314117 | | 9/2009 |
| CN | 201317117 | | 9/2009 |
| CN | 102159387 | | 8/2011 |
| JP | S54-119579 | | 9/1979 |
| JP | S55-66127 | | 5/1980 |
| JP | 06-286021 | * 10/1994 | B29D 30/48 |
| JP | 11-209004 | | 8/1999 |
| JP | 2003-154581 A | | 5/2003 |

OTHER PUBLICATIONS

Translation of the International Preliminary Report on Patentability for PCT/JP2012/060925, dated Aug. 7, 2012, pp. 1-5.
Chinese Office Action for corresponding CN201280072580.4 dated Jul. 3, 2015.

* cited by examiner

BEAD RING MANUFACTURING DEVICE

RELATED APPLICATIONS

The present invention is a U.S. National Stage under 35 USC 371 patent application, claiming priority to Serial No. PCT/JP2012/060925, filed on 24 Apr. 2012, the entirety of which is incorporated herein by reference.

FIELD OF THE INVENTION

This invention relates to a bead ring manufacturing device to form a bead ring for tires by winding a wire around the outer circumferential surface of a rotary body.

BACKGROUND OF THE INVENTION

Patent Document 1 discloses an example of the structure of a bead ring manufacturing device of this type. The bead ring manufacturing device includes a winding mechanism that forms a bead ring by winding on the outer circumferential surface of a rotary body, a diameter reducing mechanism that makes the diameter of the rotary body smaller than the inner diameter of the bead ring, and a holding mechanism that holds the beginning of a wire. The bead ring manufacturing device forms the shape of the bead ring by rotating the rotary body while making the holding mechanism hold the beginning of the wire. To extract the resultant bead ring, the wire is cut in a certain position and grasping hooks of the grasping mechanism are opened to release the beginning of the wire. Then, the diameter of the rotary body is reduced.

However, in the aforementioned bead ring manufacturing device, the action of reducing the diameter of the rotary body and the action of opening the holding hooks are done by respective actuators. This increases the number of parts such as actuators to complicate the structure of the device.

PRIOR ART DOCUMENTS

Patent Documents
Patent Document 1: Japanese Patent Application Publication No. 2003-154581

SUMMARY OF THE INVENTION

It is an object of this invention to provide a bead ring manufacturing device of a structure simplified by interlocking expansion and contraction of a rotary body and mounting and dismounting of a wire.

In order to achieve the aforementioned object, one aspect of this invention provides a bead ring manufacturing device including: a rotary body having an outer circumferential surface on which a wire is wound to form a bead ring, the rotary body being divided to form multiple partitioned members; an expanding and contracting mechanism that expands and contracts the multiple partitioned members in a radial direction of the rotary body; and a chuck mechanism that mounts and dismounts a beginning of the wire in an interlocked relationship with expansion and contraction of the partitioned members.

In the aforementioned bead ring manufacturing device, it is preferable that the expanding and contracting mechanism includes a sleeve coupled to the rotary shaft, a disk supported on a front surface of the sleeve through a bearing, and a substrate fixed to a rear surface of the sleeve, that the substrate has a front surface on which the multiple partitioned members are supported, and that the expanding and contracting mechanism further includes a guide member that moves each of the multiple partitioned members back and forth in the radial direction relative to the rotary shaft, and a cam member that moves each of the multiple partitioned members between a large-diameter position and a small-diameter position.

In the aforementioned bead ring manufacturing device, it is preferable that the guide member is formed of a guide rail fixed to the front surface of the substrate and extending in a radial direction of the substrate relative to the rotary shaft, and a guide head fixed to each of the multiple partitioned members and moving on the guide rail, and that the cam member is formed of a cam follower fixed to each of the multiple partitioned members, and a cam groove formed in the disk and letting the cam follower fit therein.

In the aforementioned bead ring manufacturing device, it is preferable that the chuck mechanism is formed of a chuck arm that grasps the beginning of the wire together with a wire block, a biasing member that biases the chuck arm in a direction in which the chuck arm is closed, an arm member that pivots on an arm fulcrum shaft supported on the substrate to open and close the chuck arm, and a cam actuator that makes the arm member pivot.

In the aforementioned bead ring manufacturing device, it is preferable that the cam actuator is formed of a cam follower provided to the arm member, and a cam hole formed in the disk and letting the follower fit therein, and that rotation of the disk reduces the multiple partitioned members in diameter and open the chuck arm.

In the bead ring manufacturing device of this invention, the rotary body used to form a bead ring is divided into multiple parts to form the partitioned members. The bead ring manufacturing device includes the expanding and contracting mechanism that expands and contracts each partitioned member, and the chuck mechanism that mounts and dismounts the beginning of the wire in an interlocked relationship with expansion and contraction of the partitioned members. In this structure, during formation of the shape of a bead ring and extraction of the resultant bead ring, the expanding and contracting mechanism increases and reduces the diameter of the partitioned members and at the same time, the chuck mechanism grasps and releases the wire. Specifically, the partitioned members are expanded and contracted and the wire is mounted and dismounted in an interlocked relationship with each other, so that these actions are not required to be done individually. Specifically, expansion and contraction of the rotary body and mounting and dismounting of the wire are interlocked, so that the structure of the bead ring manufacturing device can be simplified.

DETAILED DESCRIPTION OF THE PREFERRED EMBODIMENTS

An embodiment that embodies a bead ring manufacturing device of this invention is described below by referring to FIGS. 1 to 5.

Figure 1:
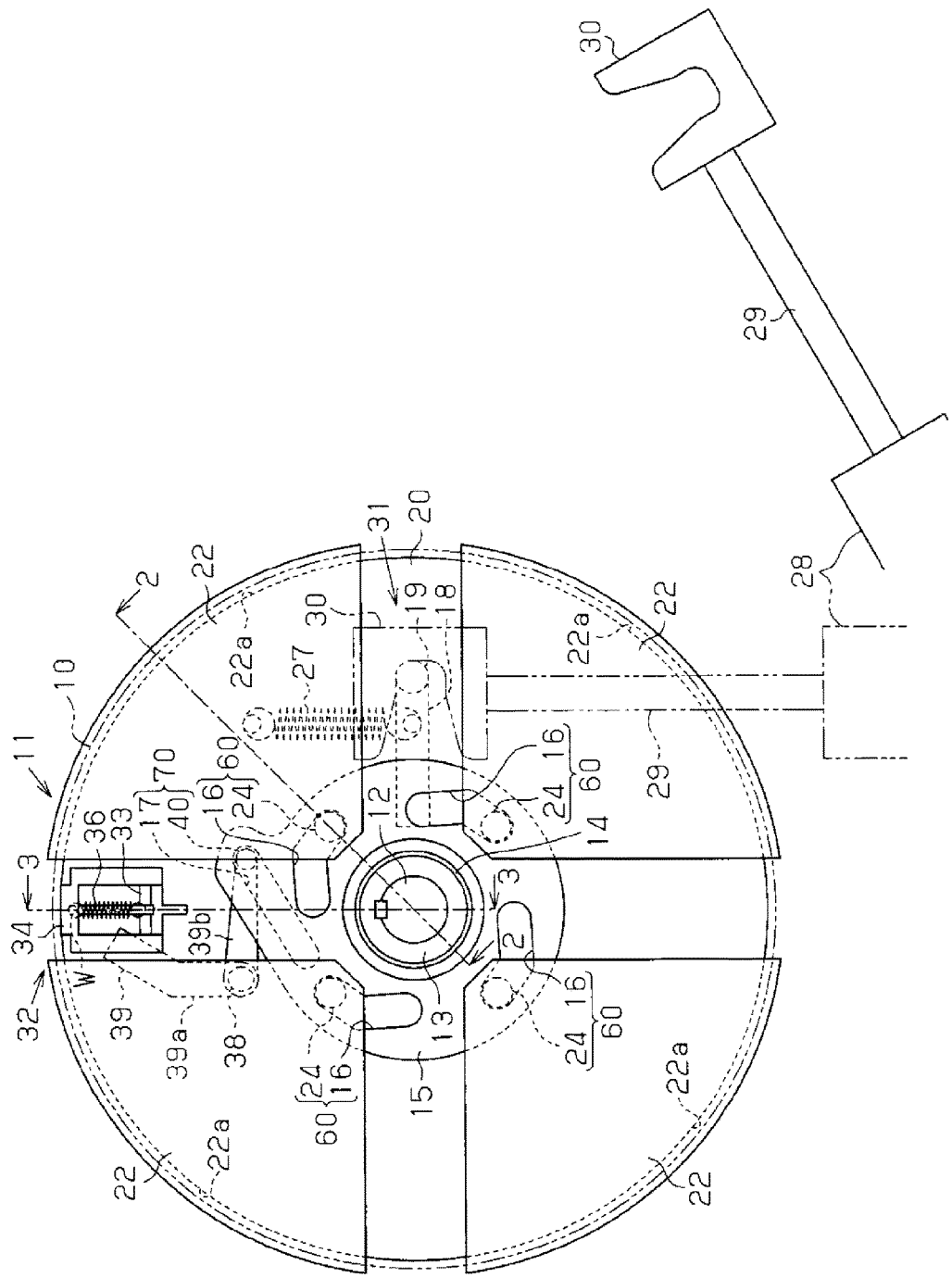
FIG. 1 is a front view showing an expanding and contracting mechanism and a chuck mechanism of a bead ring manufacturing device of an embodiment of this invention.
Figure 2:
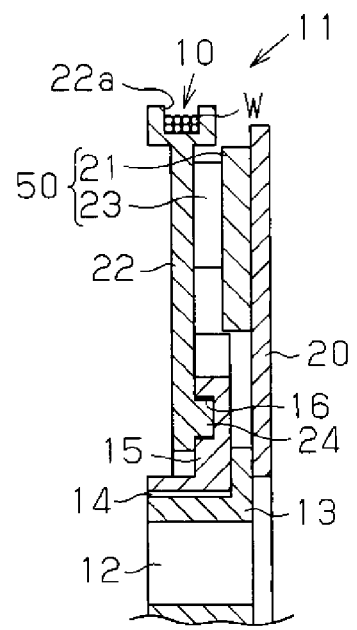
FIG. 2 is a sectional view taken along line 2-2 of FIG. 1.

As shown in FIGS. 1 and 2, a circular substrate 20 is fixed through a sleeve 13 to the outer circumferential surface of a rotary shaft 12. A disk 15 is supported on the sleeve 13 through a needle bearing 14. The disk 15 has four cam grooves 16. All the cam grooves 16 are arranged at regular intervals in the circumferential direction of the disk 15. The disk 15 has an outer circumferential part where a cam hole 17 is formed into the shape of a long hole. An engagement arm 18 extending in the radial direction of the disk 15 is fixed to the disk 15. A tip of the engagement arm 18 projects from the disk 15. An engagement target pin 19 is provided at the tip of the engagement arm 18.

A guide rail 21 extending in the radial direction of the substrate 20 is fixed to the front surface of the substrate 20. The rotary body 11 is divided uniformly into four in its circumferential direction to form four partitioned members 22. The rotary body 11 is arranged on the front surface of the substrate 20. Each partitioned member 22 has a rear surface to which a guide head 23 is fixed. The guide head 23 is guided along a guide rail 21. Cam followers 24 are formed at respective inner circumferential parts of all the partitioned members 22. Each cam follower 24 is fitted in a corresponding cam groove 16 of the disk 15. If the disk 15 rotates, each partitioned member 22 is guided along the guide rail 21 by the cam action of the cam groove 16 to move in the radial direction. The outer circumferential surface of the partitioned member 22 is provided with a groove 22a in which a bead ring 10 is formed by winding.

The disk 15 is biased by a coil spring 27 to rotate in the anticlockwise direction of FIG. 1. Thus, each partitioned member 22 held by the cam action of the cam groove 16 always tries to expand. A cylinder 28 is arranged below the rotary body 11. A hook 30 is provided at a tip of a piston rod 29. As shown by alternate long and two short dashed lines of FIG. 1, standing up of the cylinder 28 engages the hook 30 with the engagement target pin 19. If the cylinder 28 contracts in this condition against the biasing force of the coil spring 27, each partitioned member 22 is moved inward by the disk 15.

The bead ring manufacturing device includes an expanding and contracting mechanism 31 that expands and contracts each partitioned member 22. The expanding and contracting mechanism 31 is formed of the cam followers 24, the disk 15, the cam grooves 16, the coil spring 27, the engagement arm 18, and the cylinder 28. A guide member 50 is formed of the guide rail 21 provided to the substrate 20, and the guide head 23 provided to each partitioned member 22. A cam member 60 is formed of the cam follower 24 provided to each partitioned member 22, and the cam grooves 16 formed in the disk 15.

Figure 3:
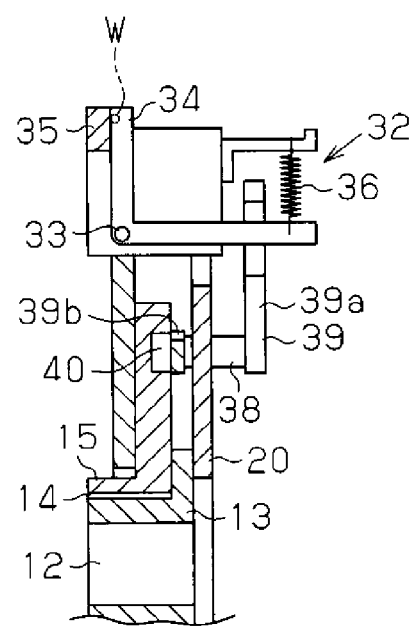
FIG. 3 is a sectional view taken along line 3-3 of FIG. 1.

As shown in FIG. 1, an outer circumferential part of the substrate 20 is provided with a chuck mechanism 32 that mounts and dismounts the beginning of a wire W. As shown in FIG. 3, the chuck mechanism 32 includes a chuck arm 34 having an L-shape side surface. A fulcrum pin 33 is attached to a corner area of the chuck arm 34. The chuck arm 34 can pivot on the fulcrum pin 33. The upper end of the chuck arm 34 grasps the beginning of the wire W together with a wire block 35. The chuck arm 34 is biased by a coil spring 36 in a direction that makes the chuck arm 34 grasp the beginning of the wire W.

As shown in FIGS. 1 and 3, an arm member 39 extending in a direction substantially orthogonal to the substrate 20 is supported on the substrate 20. The arm member 39 is formed of a first arm 39a and a second arm 39b. The arm member 39 can pivot on an arm fulcrum shaft 38. The first arm 39a is engaged with the chuck arm 34. The first arm 39a makes the chuck arm 34 pivot against the biasing force of the coil spring 36, thereby releasing the wire W from holding by the chuck arm 34 and the wire block 35. A cam follower 40 is provided at a tip of the second arm 39b. The cam follower 40 is fitted in the cam hole 17 of the disk 15. Thus, in response to the rotation of the disk 15, the cam follower 40 moves in the cam hole 17 to make the chuck arm 34 pivot on the fulcrum pin 33.

The chuck mechanism 32 is formed of the chuck arm 34, the wire block 35, the coil spring 36, the arm member 39, the cam follower 40, the disk 15, and the cam hole 17. A cam actuator 70 is formed of the cam follower 40 provided to the second arm 39b and the cam hole 17 formed in the disk 15.

The action of the aforementioned bead ring manufacturing device is described next.

Figure 4:
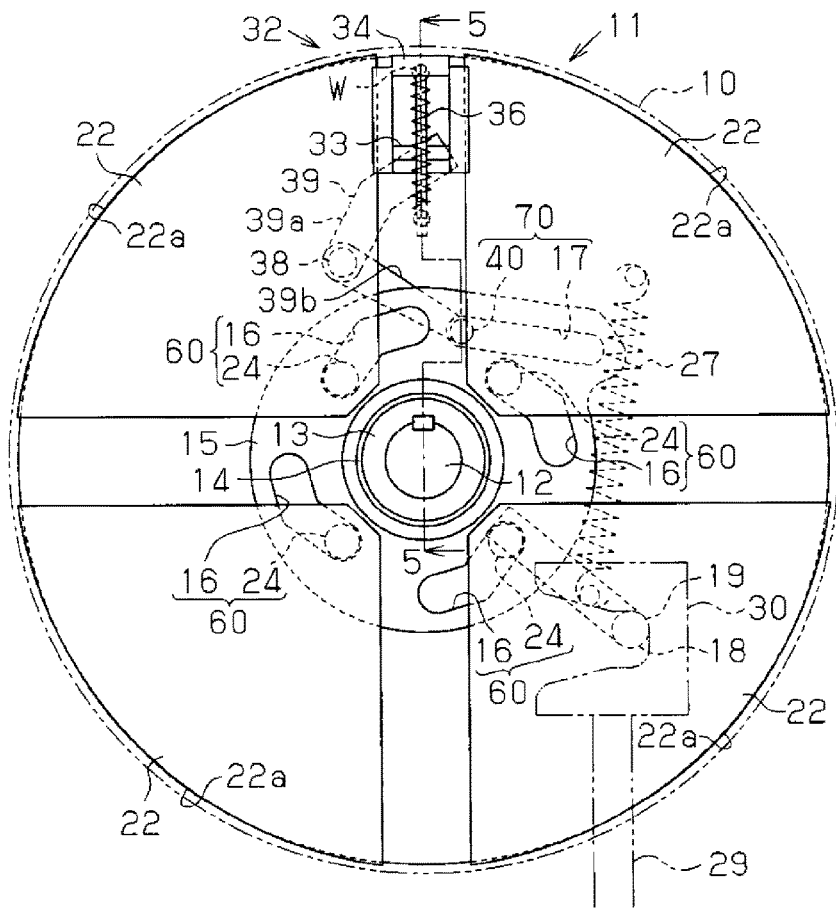
FIG. 4 is a front view showing the action of the expanding and contracting mechanism for partitioned members and the chuck mechanism.
Figure 5:
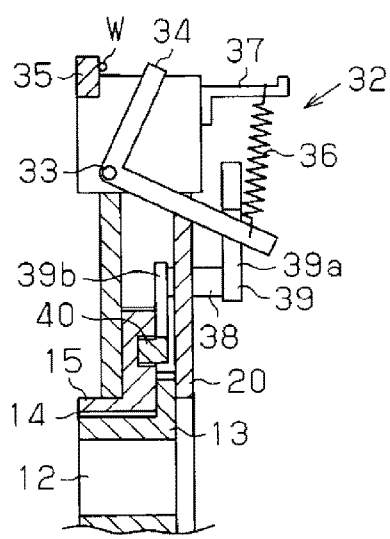
FIG. 5 is a sectional view taken along line 5-5 of FIG. 4.

As shown in FIG. 1, when the bead ring manufacturing device starts to run, the cylinder 28 rotates in the anticlockwise direction of FIG. 1 to move from its position indicated by solid lines to its position indicated by alternate long and two short dashed lines. Then, the hook 30 is engaged with the engagement target pin 19. If the cylinder 28 is contracted in this condition, the disk 15 rotates in the clockwise direction of FIG. 1 together with the engagement target pin 19 against the biasing force of the coil spring 27. This shifts each partitioned member 22 from a large-diameter condition of FIG. 1 to a small-diameter condition of FIG. 4. At this time, the cam follower 40 moves from one of opposite ends of the cam hole 17 to the other end as shown in FIG. 4. Then, the first and second arms 39a and 39b pivot on the arm fulcrum shaft 38 in the clockwise direction of FIG. 4. As a result, as shown in FIG. 5, the first arm 39a makes the chuck arm 34 pivot on the fulcrum pin 33 in the clockwise direction of FIG. 5 against the biasing force of the coil spring 36. This separates the chuck arm 34 and the wire block 35 from each other to place the beginning of the wire W between the chuck arm 34 and the wire block 35.

Next, the cylinder 28 is expanded to rotate the disk 15 in the anticlockwise direction of FIG. 1, thereby moving the disk 15 from its position of FIG. 4 to its position of FIG. 1. As a result, each partitioned member 22 returns from the small-diameter condition to the large-diameter condition. At this time, the chuck arm 34 pivots in the anticlockwise direction of FIG. 5 to move from its position of FIG. 5 to its position of FIG. 3. As a result, the beginning of the wire W is held by the chuck arm 34 and the wire block 35.

The cylinder 28 is thereafter rotated in the anticlockwise direction to move from its position indicated by alternate long and two short dashed lines to its position indicated by solid lines of FIG. 1. This releases engagement between the hook 30 and the engagement target pin 19. In this condition, the rotary body 11 is rotated around the rotary shaft 12 to wind the wire W into an outer circumferential part of the rotary body 11. After the wire W is wound in certain rows and certain tiers to form the bead ring 10, the wire W is cut at a given position by a cutting mechanism not shown in the drawings.

The cylinder 28 is thereafter rotated in the clockwise direction to move to its position indicated by alternate long and two short dashed lines of FIG. 1. Then, the cylinder 28 is contracted while the hook 30 is engaged with the engagement target pin 19. As a result, each cam follower 24 moves from one of opposite ends of a corresponding cam groove 16 to the other end as shown in FIG. 4. This moves each partitioned member 22 toward the rotary shaft 12 to place each partitioned member 22 in a place inside the inner diameter of the bead ring 10.

At the same time, the cam follower 40 moves from one of the opposite ends of the cam hole 17 to the other end, thereby releasing the beginning of the wire W from the grasp by the chuck arm 34 and the wire block 35. In this condition, the bead ring 10 can be extracted from the outer circumferential part of the rotary body 11. The extracted bead ring 10 is transferred to a subsequent step.

Accordingly, this embodiment achieves the effects as follows.

(1) The bead ring manufacturing device includes the multiple partitioned members 22 formed by dividing the rotary body 11. The bead ring manufacturing device further includes the expanding and contracting mechanism 31 that expands and contracts each partitioned member 22, and the chuck mechanism 32 that mounts and dismounts the beginning of the wire W in an interlocked relationship with expansion and contraction of the partitioned members 22. Thus, during formation of the shape of the bead ring 10 and extraction of the resultant bead ring 10, the expanding and contracting mechanism 31 expands and contracts the partitioned members 22 and at the same time, the chuck mechanism 32 grasps or releases the wire W. Specifically, expansion and contraction of the rotary body 11 and mounting and dismounting of the wire W are interlocked, so that the structure of the bead ring manufacturing device can be simplified.

(2) The expanding and contracting mechanism 31 includes the sleeve 13, the disk 15, and the substrate 20. The multiple partitioned members 22 are supported on the front surface of the substrate 20. The expanding and contracting mechanism 31 further includes the guide member 50 that moves each partitioned member 22 back and forth in the radial direction relative to the rotary shaft 12, and the cam member 60 that moves each partitioned member 22 between a large-diameter position and a small-diameter position. Thus, in response to the rotation of the rotary body 11, each partitioned member 22 is moved along the guide member 50 by the action of the cam member 60 to be placed in the large-diameter position or the small-diameter position.

(3) The guide member 50 is formed of the guide rail 21 fixed to the front surface of the substrate 20, and the guide head 23 fixed to each partitioned member 22. The cam member 60 is formed of the cam follower 24 fixed to each partitioned member 22 and the cam grooves 16 formed in the disk 15. In this structure, in response to the rotation of the rotary body 11, each cam follower 24 moves in a corresponding cam groove 16 to guide each partitioned member 22 along the guide rail 21, thereby moving each partitioned member 22 in the radial direction. In this way, each partitioned member 22 can be enlarged and contracted smoothly.

(4) The chuck mechanism 32 includes the chuck arm 34, the coil spring 36, the arm member 39, and the cam actuator 70. The chuck arm 34 grasps the beginning of the wire W together with the wire block 35. The coil spring 36 biases the chuck arm 34 in a direction in which the chuck arm 34 is closed. The arm member 39 pivots on the arm fulcrum shaft 38 to open and close the chuck arm 34. The cam actuator 70 makes the arm member 39 pivot. In this structure, in response to the rotation of the rotary body 11, the action of the cam actuator 70 makes the arm member 39 pivot on the arm fulcrum shaft 38. This allows the chuck arm 34 and the wire block 35 to mount and dismount the wire W.

(5) The cam actuator 70 is formed of the cam follower 40 provided to the arm member 39 and the cam hole 17 formed in the disk 15. Thus, if the partitioned members 22 expand and contract in response to the rotation of the disk 15, the chuck arm 34 and the wire block 35 can be opened and closed by the cam follower 40 and the cam hole 17.

This embodiment can be modified as follows.

The cam follower 24 may be provided to the disk 15 and the cam grooves 16 may be formed in the partitioned members 22.

The cam grooves 16 may be formed in an arcuate shape.

In the chuck mechanism 32, respective gears provided to the arm fulcrum shaft 38 and the fulcrum pin 33 may be in meshing engagement with each other. In this case, pivotal movement on the arm fulcrum shaft 38 is transmitted to the fulcrum pin 33 to make the chuck arm 34 pivot.

A rotation mechanism for the cylinder 28 may be omitted. Instead, the cylinder 28 may be arranged above the engagement target pin 19. In this case, the piston rod 29 is moved down to engage the tip of the piston rod 29 with the engagement target pin 19. Then, the engagement target pin 19 can be rotated in the clockwise direction of FIG. 1.

The invention claimed is:

1. A bead ring manufacturing device comprising:
a rotary body having an outer circumferential surface on which a wire is wound to form a bead ring, the rotary body being divided to form multiple partitioned members arranged circumferentially adjacent to one another around the rotary body;
an expanding and contracting mechanism that expands and contracts the multiple partitioned members in a radial direction of the rotary body; and
a chuck mechanism that mounts and dismounts a beginning of the wire in an interlocked relationship with the expansion and contraction of the partitioned members,
wherein the expanding and contracting mechanism includes a sleeve coupled to a rotary shaft, a disk supported on a front surface of the sleeve through a bearing, and a substrate fixed to a rear surface of the sleeve, the substrate having a front surface on which the multiple partitioned members are supported, and
wherein the chuck mechanism is formed of a chuck arm that is arranged to pivot about a first axis which is parallel to the substrate to grasp the beginning of the wire together with a wire block, a biasing member that biases the chuck arm in a direction in which the chuck arm is closed, an arm member that is arranged to pivot on an arm fulcrum shaft about a second axis spaced from the first axis, the arm fulcrum shaft being supported on the substrate to open and close the chuck arm, and a cam actuator that makes the arm member pivot, wherein the cam actuator is formed of a cam follower provided to the arm member, and a cam hole formed in the disk and letting the follower fit therein, the cam hole encircling the follower, and the disk further comprises a respective cam groove for each partitioned member that surrounds a respective cam follower of each partitioned member such that rotation of the disk is capable of commencing simultaneously and then carrying out the radial contraction of the partitioned members, and also capable of opening the chuck arm away from the wire block to release the wire.

* * * * *